Patented Dec. 28, 1948

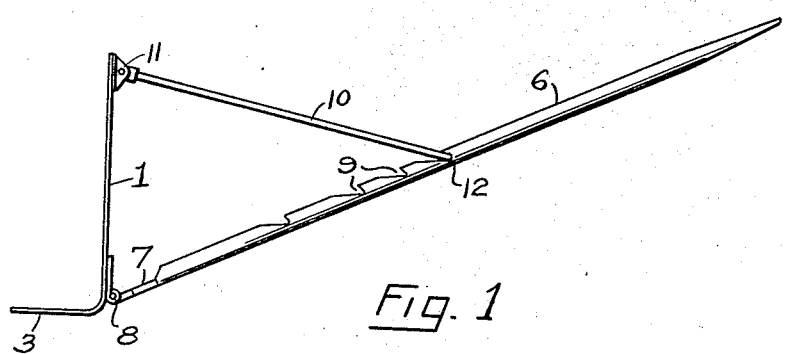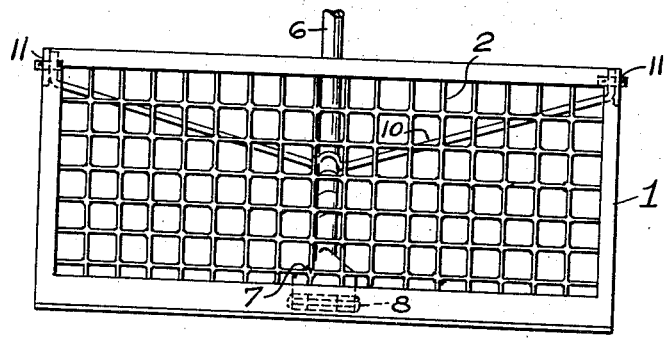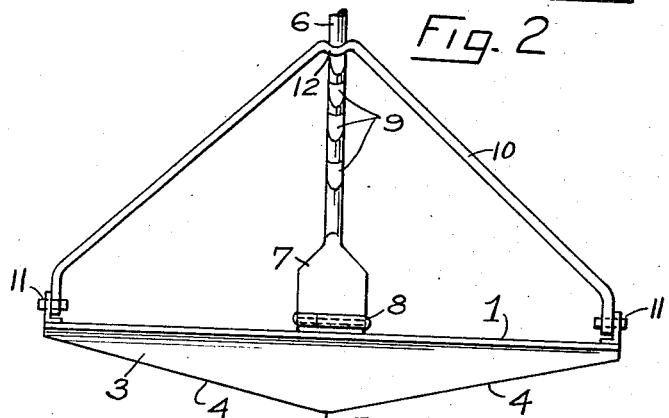

2,457,441

UNITED STATES PATENT OFFICE 2,457,441

CHEESE PUSHER

Frank B. Branchfield, Sr., Canton, Ill.

Application September 27, 1946, Serial No. 699,804

5 Claims. (Cl. 210—149)

My present invention relates generally to dairy products and the cheese making industry, and more specifically to an improved cheese pusher in the nature of a manually operated implement for effective use with the contents of a vat or tank in pushing the coagulated cheese curd into a compact mass formation. As is well known, in the process of cheese making it is desirable and necessary to quickly work and remove the thin sweet watery whey from the mass of curd and thus eliminate the probability of formation and growth of acid conditions. The primary object of the invention is the provision of a manually operated implement embodying a reticulated screen for effective use in pushing the curd and disposing of the whey, within the vat or tank; and in addition the implement is also available and especially adapted for stationary use in the vat while withdrawing the whey, to prevent the cheese curd from flowing back into the vat.

The implement is composed of a minimum number of component parts that may readily be manufactured at low cost of production; the parts may easily be assembled in a compact mechanical structure that is light in weight for convenient use; and the parts are separable in order that they may be cleansed and maintained in excellent sanitary condition.

The invention consists in certain novel combinations and arrangements of the parts as hereinafter described and more specifically set forth in the appended claims.

In the accompanying drawings I have illustrated one complete example of the physical embodiment of my invention in which the parts are combined and arranged in accord with one mode I have devised for the practical application of the principles of my invention. It will, however, be understood that changes and alterations are contemplated and may be made in these exemplifying drawings and mechanical structures, within the scope of my claims, without departing from the principles of the invention.

Figure 1 is a side view of the pusher or implement in which my invention is physically embodied.

Figure 2 is a view in front elevation, as seen from the left in Fig. 1; and

Figure 3 is a top plan view of the implement in Fig. 1, with a portion of the handle omitted for convenience of illustration.

In carrying out my invention I employ a rectangular or oblong shaped frame 1, of suitable material, in which a reticulated pusher screen 2, of appropriate gage or mesh, is rigidly mounted, and a flat angular blade 3 is rigidly united with the lower longitudinal bar of the frame.

The blade, like other parts of the implement, is fashioned from stainless material that may readily be cleansed for sanitary purposes, and it is mounted in a plane at right angles to, or perpendicular to, the plane of the screen and its frame. The blade extends the full length of the screen, with its front free edges 4, 4, disposed on obtuse angles, which edges terminate at a rounded central point 5, to conform to the contour of the vat or tank in which the implement is being employed.

For convenience in manipulating the implement it is provided with a handle 6 having a substantially wide head 7 that is hinged or pivoted at 8 to a central part of the lower bar of the screen frame, and the handle is provided with a series of spaced transversely arranged notches 9 for selective use in connection with an adjustable brace 10, which is pivoted or hinged at 11, 11 to the upper longitudinal bar of the screen frame.

As here shown, the brace is fashioned in the form of a two-arm yoke with the ends of its outspreading arms forming widely spread pivotal joints 11, 11 on the screen frame, to insure stability of the implement as it is being pushed forwardly.

At the free end of the brace, the converging arms are fashioned with a half-loop or semicircular seat 12 for selective co-action with the series of notches on the handle to retain the handle and the frame in adjusted angular position.

By the use of the adjustable brace, the pivoted handle and the screen may relatively be adjusted for various angles and retained by the co-acting detent and notch, in order that the implement may be manipulated to advantage under different conditions of the curd and whey.

The obtusely arranged front edges of the blade conform to the contour of the bottom of standard types of vats or tanks, thus adapting the implement for effective use as a scraper, or as a barrier, for the cheese curd.

The pivotal arrangements of the handle and the brace with relation to the pusher facilitate removal of the implement from the vat without disturbing the curb, as, when pulling on the handle, the pusher may be folded forwardly into alinement with the handle, thus reducing to a minimum the resistance to the implement, and leaving the curd without disturbance.

Having thus fully described my invention, what I claim as new and desire to secure by Letters Patent is:

1. In a pushing implement as described, the combination with a longitudinally extending frame and a reticulated screen mounted therein, and an adjustable handle pivotally connected to the lower portion of the frame, of a bracing yoke having a pivotal connection with the upper portion of the frame, and co-acting means on the handle and yoke for retaining the frame and handle in adjusted angular position.

2. In a pushing implement as described, the combination with a longitudinally extending frame and a reticulated screen mounted therein, and an adjustable handle pivotally connected with a lower portion of the frame, of a brace arm pivotally mounted on an upper part of the frame, a series of spaced notches on the handle, and a detent fashioned at the free end of the brace arm for selective engagement with the notches for retaining the frame and handle in adjusted angular relation.

3. In a pushing implement as described, the combination with a longitudinally extending frame and a reticulated screen mounted therein, and an adjustable handle pivoted on the frame, of a brace arm having a pivotal joint on the frame and spaced from the handle pivot, a longitudinally extending blade rigid with the frame and disposed at an angle therefrom, and co-acting means on the free end of the arm and on the handle for retaining the frame and handle in adjusted angular position.

4. In a pushing implement as described, the combination with a pushing screen, a blade rigid with the screen and disposed at an angle thereto, and a handle pivoted on the screen, of a brace yoke having spaced pivotal connection with the screen remote from the handle pivot, a series of notches on the handle, and a semi-circular detent rigid with the free end of the yoke for selective engagement with the notches.

5. In a pushing inmplement, the combination with a pushing screen, an angularly disposed blade having front obtusely disposed edges, and a handle pivoted on the screen, of a brace arm pivoted on the screen, and co-acting means on the free end of the brace arm and the handle for retaining the handle and screen in adjusted angular position.

FRANK B. BRANCHFIELD, Sr.

REFERENCES CITED

The following references are of record in the file of this patent:

UNITED STATES PATENTS

| Number | Name | Date |
|---|---|---|
| 452,044 | Doolittle | May 12, 1891 |
| 827,542 | Lawson | July 31, 1906 |
| 1,196,206 | Bulger et al. | Aug. 29, 1916 |